S. T. JEFFERIS.
FLY TRAP.
APPLICATION FILED OCT. 17, 1914.
1,178,076.
Patented Apr. 4, 1916.
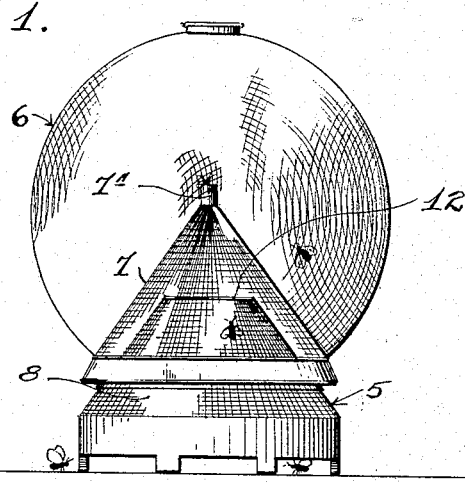
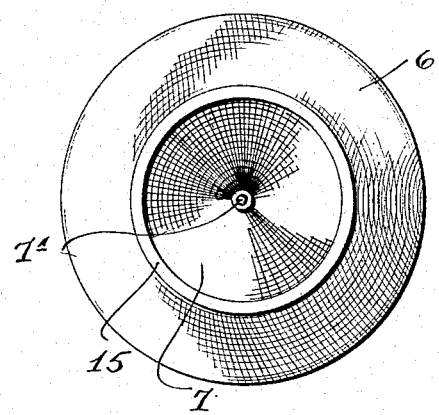
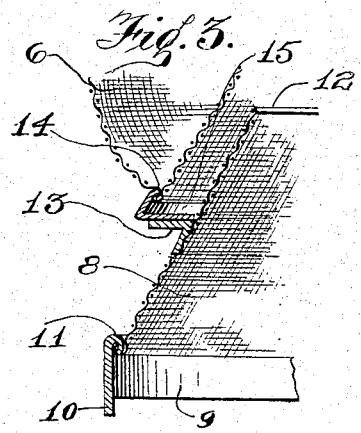
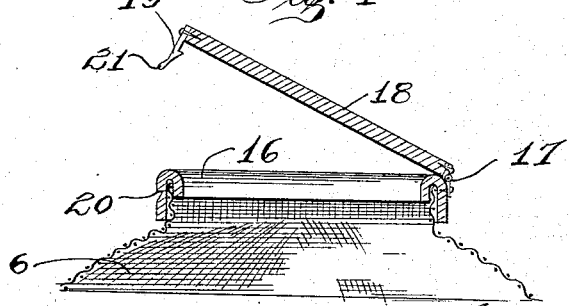
Inventor
Samuel T. Jefferis
By Richard B. Owen,
Attorney

UNITED STATES PATENT OFFICE.

SAMUEL T. JEFFERIS, OF HOPEDALE, MASSACHUSETTS.

FLY-TRAP.

1,178,076.  Specification of Letters Patent.  Patented Apr. 4, 1916.

Application filed October 17, 1914. Serial No. 867,195.

*To all whom it may concern:*

Be it known that I, SAMUEL T. JEFFERIS, a subject of the King of Great Britain, residing at Hopedale, in the county of Worcester and State of Massachusetts, have invented certain new and useful Improvements in Fly-Traps, of which the following is a specification.

This invention relates to insect traps, and more particularly relates to a device of this character adapted to attract such insects as the ordinary household fly, a particular aim being to afford a trap of this type in which ingress shall be comparatively easy and egress practically impossible.

A more specific object is to provide in a trap of the type set forth means for removably nesting conical leading funnels in such manner as to utilize a fly's natural tendency to a certain mode of progression in order to assure its entrance into the trap.

A specific object of equal importance with the foregoing is to provide a trap of the character described which shall be constructed with such regard to proportion, number and arrangement of parts as to render it capable of being cheaply manufactured as well as durable and efficient in operation.

The above and additional objects which will become apparent as this explanatory description proceeds, are accomplished by such means as are illustrated in the accompanying drawings, described in the following specification, and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts: Figure 1 is an elevational view of the trap showing the manner in which an insect may readily gain ingress thereto, Fig. 2 is a bottom plan view of the removable globe trap, Fig. 3 is a sectional view taken on a vertical plane through the device illustrating the method of seating the globe trap, and Fig. 4 is an enlarged sectional detail illustrating the hinged closure wherethrough the trapped insects may be removed and the spring catching means therefor.

In a preferred embodiment of this invention as illustrated, there are provided a base portion terminated as a whole by the numeral 5 and a removable upper portion 6 which comprises the trap proper having connected therewith the funnel 7 adapted to nest over the similar but truncated funnel 8 of the base portion. This base portion comprises the annular ring 9 provided with a number of lateral projections 10 of a similar size to form legs or supports therefor, and has its upper edge downwardly bent as indicated at 11 in order that it may be crimped over the lower edge of the truncated funnel 8 which, in common with the funnel 7 and globe 6 is formed of a foraminous material preferably of a light wire netting and of the frusto-conical shape illustrated having its upper truncated edge bound as indicated at 12. Midway between the upper and lower edges of the cone 8 is horizontally secured the substantially L-shaped flange 13 which is annular and completely surrounds the cone with its extending portion in a horizontal plane.

The globe 6 is connected to the funnel 7 as indicated in Figs. 2 and 3, the meeting edges of which as indicated at 14 being both clampingly secured under the bent over upper edge of an annular flange 15 which as clearly illustrated in Fig. 3 is of such size as to snugly fit around the cone 8 when clearly positioned upon the flange 13. This construction spaces the nesting cone 7 from the entrance cone 8 in a manner advantageous to the trapping of insects as will be hereinafter more fully explained. The upper portion of this inner cone 7 communicates with the interior of the globe 6 by means of a metallic nipple 7ª affording a passageway of such size as to easily accommodate one fly in its upward travel.

The closure for the globe 6 is illustrated in detail in Fig. 4, and as shown, consists of crimped annular gripping ring which is clamped upon the upstanding edges of the foraminous material composing the globe 6, the latter being cut at this point. To the ring 16, there is hinged as indicated at 17, a closure cap 18 which is provided at one point with the spring catch 19 adapted to engage in a suitable notch 20 formed in the immediately adjacent portion of the ring 16 in the obvious manner, said catch being elongated as shown at 21 to provide a ready means for accommodating the operator's fingers when it is desired to disengage the catch.

In operation, it will be seen that a suitable bait may be positioned at any convenient point within the trap when the latter is assembled as shown in Figs. 1 and 3, such as within the globe 6 at the juncture of the latter with the inner funnel 7 or upon the flanges 15 of the removable portion. Flies attracted by this bait will travel up the inner portion of the base cone 8 until reaching the comparatively wide mouth 12 whence their more probable course of action will take them down the sloping outer sides of the base funnel until reaching the flange 15 since what may be termed the natural progress of a fly is usually confined to a movement essentially forward although generally diagonally to some immediately previous line of travel, it will be apparent that the forward procedure of the fly no matter how diagonal will carry him across the flange 15 and up the inside of the trap funnel 7 until the passageway 7ª is eventually passed and the fly has gained entrance to the interior of the globe 6 from whence it is practically impossible for it to find egress. When it is desired to remove the flies thus trapped the upper portion may be lifted from the flange 13 and the flies removed by way of the removable closure 18 and the globe then replaced in its former position. It will thus be seen that after the fly has passed the broad entrance 12 that he is practically as good as trapped due to the spacing of the interior cone from the base cone in the manner effected by the flanges 13 and 15. While in the foregoing however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. An insect trap comprising a lower annular ring, a truncated foraminous funnel mounted on said ring, an angular flange ring resting upon said funnel adjacent the central portion of the same, an angular supporting ring having one angle resting upon said flange, and a globe trap member secured to the remaining angle of said angular supporting ring and provided with a normally closed discharge opening.

2. An insect trap comprising a truncated foraminous funnel, a supporting ring for said funnel provided with depending legs, a ring clamped upon said funnel, a supporting ring resting upon the last mentioned ring and having an upturned edge, a second truncated foraminous funnel secured to said upturned edge and extending above the first mentioned funnel, a nipple secured upon the upper end of the last mentioned funnel, a foraminous globe secured to said upturned edge and inclosing the second mentioned funnel, said globe having a discharge opening formed therein, and means for normally closing said discharge opening.

In testimony whereof I affix my signature in presence of two witnesses.

SAMUEL T. JEFFERIS.

Witnesses:
  THOMAS L. O'BRIEN,
  CHARLES W. GOULD.

Copies of this patent may be obtained for five cents each, by addressing the "Commissioner of Patents, Washington, D. C."